United States Patent [19]
Hale et al.

[11] Patent Number: 4,721,576
[45] Date of Patent: Jan. 26, 1988

[54] WELL DRILLING FLUIDS AND PROCESS FOR DRILLING WELLS

[76] Inventors: Arthur H. Hale; Gordon T. Rivers, both of P.O. Box 370, Sand Springs, Okla. 74003

[21] Appl. No.: 808,716

[22] Filed: Dec. 13, 1985

[51] Int. Cl.$^4$ .............................................. C09K 7/02
[52] U.S. Cl. ................................. 252/8.51; 252/8.514
[58] Field of Search ......................... 252/8.5 A, 8.5 C

[56] References Cited
U.S. PATENT DOCUMENTS

| | | | |
|---|---|---|---|
| 2,650,905 | 9/1953 | Fordyce et al. | 252/8.5 |
| 3,730,900 | 5/1973 | Perricone et al. | 252/8.5 |
| 4,554,307 | 11/1985 | Farrar et al. | 524/425 |
| 4,561,986 | 12/1985 | Villa et al. | 252/8.5 |

Primary Examiner—Herbert B. Guynn
Attorney, Agent, or Firm—C. R. Reap; R. Laddie Taylor

[57] ABSTRACT

The rheological characteristics of aqueous well drilling fluids are improved by incorporating into the fluids a small amount of a sulfonated styrene-itaconic acid copolymer.

6 Claims, No Drawings

WELL DRILLING FLUIDS AND PROCESS FOR DRILLING WELLS

BACKGROUND OF THE INVENTION

This invention relates to aqueous well drilling fluids and more particularly to improved dispersants for aqueous well drilling fluids.

When drilling wells, particularly oil and gas wells it is common practice to circulate a liquid medium into the borehole. The liquid medium, commonly referred to as a drilling fluid or a drilling mud, serves several functions in the well-drilling process. For example, the drilling fluid serves as a vehicle for removing drilling cuttings from the borehole. Another function of the drilling fluid is to cool and lubricate the drill bit. Other functions are to support part of the weight of the drill string and to transmit hydraulic power to the drill bit. Another consideration is that the drilling fluid should be formulated and applied in such a manner that minimal formation damage results and therefore minimal clogging of the oil-bearing strata occurs. To accomplish these functions the drilling fluid should have three major properties: It must provide weight, i.e. hydrostatic head; it must have good flow properties, i.e. good rheological properites; and it must provide filtration control.

A drilling fluid is essentially one of three types; a solids laden fluid with an aqueous continuous phase; a solids laden fluid with a hydrocarbon base; and gaseous. The present invention concerns the first category, that is well-drilling fluids having a continuous aqueous phase, commonly referred to as aqueous drilling fluids.

One of the principal problems encountered in well-drilling operations is that the drilling process requirements continually change due to continuously changing drilling environments. For example, as the depth of the well increases the temperature and pressure in the region of the drill bit increases. Furthermore, contaminants such as drill cuttings, formation water and salts enter the drilling zone. Also, as the drilling proceeds through different strata the mineral constitution of the earth changes. To minimize any adverse effect from these factors additives are incorporated into the drilling fluid from time to time. The present invention relates to one of these additives, a dispersant (also commonly referred to as a "thinning agent").

DESCRIPTION OF THE PRIOR ART

The principal function of the dispersant in a drilling fluid is to maintain the properties of the drilling fluid in the various environments encountered by the drilling fluid. Many different dispersants have been used in the past with varying degrees of success. Earlier dispersants included phosphates, tannins, lignite and lignin (ligno-sulfonate). These earlier dispersants had serious shortcomings, such as ineffectiveness at higher temperatures and sensitivity to salts such as sodium-and calcium-based materials.

Later dispersants, such as polyacrylates and copolymers of styrene and maleic anhydride have superior performance at high temperatures but these materials likewise have drawbacks. Sulfonated styrene-maleic anhydride copolymers are quite expensive and are somewhat sensitive to certain environments such as those containing high concentration of salts of calcium and other alkali and alkaline earth metals. Furthermore, these dispersant systems do not always efficiently disperse solids at higher concentration levels such as those resulting from the addition of gel, e.g. bentonite, to drilling muds or resulting from the accumulation of drill cuttings due to poor solids control. Acrylic-based polymers are less expensive than sulfonated styrene-maleic anhydride copolymers but they too exhibit sensitivity to salts. Acrylic-based polymers are effective dispersants of solids, such as bentonite, clays, drill cuttings, etc. Dispersants for well-drilling fluids which can be used in a variety of environments and which are not so subject to the above mentioned shortcomings are constantly being sought. The present invention presents a family of novel well-drilling dispersants which eliminate or lessen the adverse impact of some of the disadvantages of earlier dispersants.

The use of polymeric substances for water treatment has been disclosed in the patent literature. U.S. Pat. No. 4,374,733 (Snyder et al) discloses the use of combinations of styrene-maleic anhydride copolymers and acrylic acid-alkylhydroxy acrylate copolymers as scale inhibitors and dispersants for solid particulate matter, particularly including iron oxide and clay, in cooling water systems. U.S. Pat. No. 4,324,664 (Snyder et al) discloses the use of combinations of acrylic acid-alkyl hydroxylated acrylate copolymers and esters of aliphatic sulpho-dicarboxylic acid as dispersants for inorganic and organic matter in boiler and cooling water systems. U.S. Pat. No. 4,029,577 (Godlewski et al) teaches the use of acrylic acid-hydroxylated alkyl acrylate copolymers to control the formation and deposition of scale and suspended solid matter in aqueous media. U.S. Pat. No. 3,663,448 (Ralston) discloses the use of combinations of amino phosphonate compounds and polyacrylic acid, polyacrylamide or copolymers of acrylic acid and acrylamide to inhibit the formation of scale-forming salts. U.S. Pat. No. 4,209,398 discloses the use of combinations of polymers of ethylenically unsaturated compounds containing carboxyl radicals and phosphates or phosphonates to prevent scale formation. U.S. Pat. No. 2,723,956 (Johnson) teaches the use of copolymers of maleic anhydride and other ethylenic compounds, such as styrene or methyl methacrylate, for boiler scale treatment. U.S. Pat. No. 3,549,538 (Jacklin) discloses the use of combinations of nitrilo phosphonates or nitrilo carboxylates and polymers, such as styrene-maleic anhydride copolymer or acrylic acid homo- or copolymers, as scale inhibiting compositions. U.S. Pat. No. 3,650,970 (Pratt et al) discloses the use of esters of sytrene-maleic anhydride copolymers to inhibit the formation of scale. U.S. Pat. No. 4,288,327 (Godlewski et at) discloses the use of sulfonated styrene-maleic anhydride copolymers to disperse solids, such as iron oxide or clay, in aqueous media.

Some of the above compositions have been described in the patent literature as useful for drilling mud dispersants. For example U.S. Pat. No. 3,730,900 (Perricone et al) discloses the use of sulfonated styrene-maleic anhydride copolymers as dispersants for aqueous drilling fluids. U.S. Pat. No. 4,518,510 (Gleason et al) discloses the use of water-soluble sulfonated vinyl toluene-maleic anhydride copolymers as dispersants for drilling muds.

OBJECTS

It is an object of the invention to present novel dispersant systems for well-drilling fluids. It is another object of the invention to present well-drilling fluids which are particularly effective in high temperature environments. It is another object of the invention to present well drilling fluids which are effective in various substrata. It is another object of the invention to present an improved method for drilling wells in high temperature environments. It is another object of the invention to present an improved method of drilling wells in substrata of varying composition. These and other objects of the invention will become apparent upon reading the following description and examples.

SUMMARY

The above objects are achieved by using as the dispersant in a well-drilling fluid a dispersant comprised of a water-soluble sulfonated styrene-itaconic acid copolymer. Details relating to the molecular weight ranges of these copolymers and their dosages are disclosed in following description.

DETAILED DESCRIPTION

The sulfonated styrene-itaconic acid copolymer must be subtantially water-soluble to perform satisfactorily in the process of the invention. The water-solubility of the sulfonated styrene-itaconic acid copolymer is influenced by both the molecular weight of the copolymer and the presence of the sulfonate groups on the styrene ring. As the molecular weight of the coplymer increases its water-solubility decreases. Suitable sulfonated copolymers are prepared from styrene-itaconic acid copolymers having a lower weight average molecular weight limit of about 500. The lower molecular weight limit is generally about 1000 and preferably at least about 1500. The upper weight average molecular weight limit is generally about 15,000 and usually not greater than 10,000. The preferred weight average molecular weight limit is preferably not greater than about 5,000. The above molecular weight limits are before sulfonation and, accordingly, do not include the weighting of the sulfonate groups.

The sulfonate groups improve the water-solubility of the copolymer. The sulfonated styrene-itaconic acid copolymer contains a sufficient number of sulfonate groups to render the given copolymer water-soluble. The itaconic acid of the copolymer may be in the form of the acid or an alkali metal salt of the acid.

The molar ratio of styrene to itaconic acid units may vary over a wide range. For example, the molar ratio may vary from 100 moles of sulfonated styrene per each mole of itaconic acid to about 1 mole of sulfonated styrene per each 100 moles of itaconic acid. It is usually preferred to maintain the ratio of styrene units to itaconic acid units in the copolymer in the range of about 10:1 to about 1:10. In the most preferred embodiments the molar ratio of styrene units to itaconic acid units is in the range of about 4:1 to 1:4.

The water-soluble sulfonated styrene-itaconic acid copolymer can be prepared by any polymerization technique which will produce a copolymer having the desired characteristics. In a typical preparation procedure the sodium salt of styrene sulfonate is dissolved in water with the desired amount of itaconic acid. A catalyst, such as ammonium persulfate, is added to the reaction mixture and the polymerization is carried out at a controlled temperature. In an alternate procedure styrene and itaconic acid can be polymerized and the resulting product can then be sulfonated. The preparation of the sulfonated styrene-itaconic acid copolymer forms no part of this invention.

The total amount of water-soluble sulfonated styrene-itaconic acid copolymer required in the compositions of the invention to produce the desired result will vary over a wide range as the drilling mud formulation and subterranean formation composition vary. In general the required amount can vary from about 0.05 lbs/bbl (pounds per barrel of total drilling mud formulation) to about 10 lbs/bbl. Amounts in the range of about 0.1 to about 5 lbs/bbl are usually preferred for most drilling mud applications.

The invention is further illustrated in the following examples in which parts and percentages are on a weight basis, unless otherwise indicated.

EXAMPLE I

To a reaction vessel equipped with an agitator and a heating means was charged 50 grams of water. The vessel and its contents are heated to 85° C. A solution of 92 grams of sodium p-vinyl benzene sulfonate (sold by E. I. du Pont de Nemours and Company, Inc. under the name sodium styrene sulfonate) and 260 grams of itaconic acid in 600 grams of water was prepared. The sodium styrene sulfonate-itaconic acidwater mixture was warmed to 60° C. with agitation to dissolve the dry chemicals in the water. A solution of 25 grams of of ammonium persulfate in 175 grams of water was separately prepared. The sodium styrene sulfonate-itaconic acid solution and the ammonium persulfate solution were combined with continuous agitation over a period of 2 hours in alternating portions of 50 grams and 5 grams respectively, at a rate such that the reaction temperature was maintained in the range of 80 to 90° C. After all of the sodium styrene sulfonate-itaconic acid solution was added, the reactor temperature was raised to 95° C. and the remaining ammonium persulfate solution was added dropwise over a 15 minute period. After completion of the addition of the ammonium persulfate solution the reaction vessel contents was maintained at 95° C. for an additional hour. The aqueous solution of copolymer was cooled. The polymeric product had a number average molecular weight of 4486 (determined by liquid gel permeation chromatography) and a styrene to itaconic acid molar ratio of 1 to 4.3 (determined by nuclear magnetic resonance).

EXAMPLE II

A synthetic drilling fluid base mud was prepared as follows: A mixture comprised of 252 g of water and 10 g of bentonite clay was blended in a multimixer sufficiently to hydrate the bentonite. Next 50 g of kaolinite clay and 416 g of barite were blended into the hydrated bentonite and the pH of the resulting mixture was adjusted to 10 with concentrated sodium hydroxide.

Test drilling fluid samples were prepared by blending polymeric dispersants with the above-described base mud at several lbs/bbl (pounds of dispersant per barrel of drilling mud) concentration levels. Test samples of the product of EXAMPLE I (SSI) were compared to the test samples of a sulfonated styrene-maleic anhydride copolymer having a 1:1 styrene to maleic anhydride molar ratio, a presulfonation number average molecular weight of about 1600 and a sulfonate to styrene ratio of about 0.66, sold by ChemLink Petroleum Inc. under the trademark SSMA TM 1000L. The concentration levels of the SSI were 0.229, 0.5, 0.787 and 0.912 lbs/bbl and those of the SSMA 1000L were 0.5, 1.0 and 2.0 lbs/bbl. A control sample which contained no dispersant was also prepared. Each of the test samples and the control sample were aged by hot rolling first at 150° F. (65.5° C.) for 16 hours and then at 400° F. (204.4° C.) for 16 hours. The samples were cooled to room temperature, mixed in a multimixer for ten minutes and tested for rheological characteristics using a Fann Model 35A rheometer. The plastic viscosity (PV) in centipoises (cp) and the yield point (YP) in pounds per 100 square feet were calculated and the 10 second and 10 minute gel strengths (GS) were measured for each test. The results are tabulated in TABLE I.

TABLE I

| Control (No Dispersant) | |
|---|---|
| Plastic Viscosity, cp. | 25 |
| Yield Point, lbs/100 ft$^2$ | 35 |
| 10 sec. gel strength, lbs/100 ft$^2$ | 26 |
| 10 min. gel strength, lbs/100 ft$^2$ | 50 |

| Series 1 (SSI) | | | | |
|---|---|---|---|---|
| Dispersant Conc. lbs/bbl | 0.229 | 0.5 | 0.787 | 0.912 |
| PV, cp | 27 | 29 | 32 | 32 |
| YP, lb/100 ft$^2$ | 15 | 9 | 1 | 0 |
| 10 sec. GS, lb/100 ft$^2$ | 4 | 3 | 2 | 1 |
| 10 min. GS, lb/100 ft$^2$ | 27 | 19 | 4 | 2 |

| Series 2 (SSMA 1000L) | | | |
|---|---|---|---|
| Dispersant Conc. lbs/bbl | 0.5 | 1.0 | 2.0 |
| PV, cp | 34 | 38 | 40 |
| YP, lb/100 ft$_2$ | 19 | 14 | 7 |
| 10 sec. gs, lb/100 ft$_2$ | 10 | 3 | 1 |
| 10 sec. gs, lb/100 ft$_2$ | 15 | 10 | 1 |

This example demonstrates that styrene-itaconic acid copolymer is superior to styrene-maleic anhydride copolymer as a drilling mud dispersant at the test conditions. This can most clearly be seen by comparing the results obtained using 0.912 lb/bbl of styrene-itaconic acid copolymer with those obtained using 1.0 lb/bbl of styrene-maleic anhydride copolymer. All of the values obtained using 0.912 lb/bbl styreneitaconic acid copolymer are significantly better than those obtained using 1.0 lb/bbl of styrene-maleic anhydride copolymer. In fact the values obtained using the 0.912 lb/bbl styrene-itaconic acid copolymer are as good as those obtained using 2.0 lb/bbl of styrene-maleic anhydride copolymer.

EXAMPLE II

To evaluate the temperature stability of styrene-itaconic acid copolymers one set of samples of the SSI-containing mud, the SSMA-containing mud and the control were hot rolled at 150° F. (65.5° C.) for 16 hours and then at 495° F. (257.2° C.) for 16 hours and another set of the same samples were hot rolled first at 150° F. for 16 hours and then at 495° F. for 32 hours. The concentration of the SSI and SSMA 1000L in each of the dispersant-containing samples was 0.23 lb/bbl. The results are tabulated in TABLE II.

TABLE II

| | AGING | | | | | |
|---|---|---|---|---|---|---|
| | 16 Hrs. at 150° F. plus 16 Hrs. at 495° F. | | | 16 Hrs. at 150° F. plus 32 hrs. at 495° F. | | |
| Dispersant | None (Control) | SSI | SSMA | None (Control) | SSI | SSMA |
| PV, cps | 24 | 39 | 37 | 28 | 32 | 32 |
| YP, lbs/100 ft$_2$ | 42 | 9 | 12 | 53 | 26 | 36 |
| 10 sec. GP, lbs/100 ft$_2$ | 30 | 2 | 4 | 38 | 5 | 10 |
| 10 min. GP, lbs/100 ft$_2$ | 50 | 5 | 10 | 61 | 11 | 22 |

This example illustrates the fact that the styrene-itaconic acid polymer-containing drilling mud samples have heat stability properties equivalent to or better than drilling mud samples containing styrene-maleic anhydride copolymer as the dispersant.

The foregoing description and examples are intended to be illustrative and not limitative. The scope of the invention is limited only by the breadth of the appended claims.

What is claimed is:

1. A composition comprised of
   (a) an aqueous base,
   (b) a clayey material suspended in said aqueous base, and
   (c) a water-soluble sulfonated styrene-itaconic acid copolymer having a pre-sulfonation molecular weight in the range of about 500 to about 10,000, the total weight of the polymer of (c) present in the composition being in the range of about 0.05 to 10.0 pounds per barrel of composition.

2. The composition of claim 1 wherein the ratio of sulfonated styrene units to itaconic acid units is about 100:1 to 1:100.

3. The composition of either of claims 1 or 2 wherein the clayey material is bentonite.

4. In a well-drilling method wherein an aqueous drilling fluid is circulated in the borehole the improvement comprising using as the drilling fluid the composition of claim 1.

5. The improved method of claim 4 wherein the ratio of sulfonated styrene units to itaconic acid units in said copolymer is about 100:1 to 1:100.

6. The improved method of either of claims 4 or 5 wherein the clayey material is bentonite.

* * * * *

UNITED STATES PATENT AND TRADEMARK OFFICE
CERTIFICATE OF CORRECTION

PATENT NO.   : 4,721,576
DATED        : January 26, 1988
INVENTOR(S)  : Arthur H. Hale et al.

It is certified that error appears in the above—identified patent and that said Letters Patent is hereby corrected as shown below:

Title page:

[73]   Assignee:   PONY INDUSTRIES, INC.
                   New York, New York

Signed and Sealed this

Thirteenth Day of December, 1988

Attest:

DONALD J. QUIGG

Attesting Officer            Commissioner of Patents and Trademarks